United States Patent
Schuttenberg et al.

(10) Patent No.: US 12,293,189 B2
(45) Date of Patent: May 6, 2025

(54) DATA VALUE PREDICTION AND PRE-ALIGNMENT BASED ON PREFETCHED PREDICTED MEMORY ACCESS ADDRESS

(71) Applicant: Arm Limited, Cambridge (GB)

(72) Inventors: Kim Richard Schuttenberg, Gilbert, AZ (US); Richard F Bryant, Chandler, AZ (US)

(73) Assignee: Arm Limited, Cambridge (GB)

( * ) Notice: Subject to any disclaimer, the term of this patent is extended or adjusted under 35 U.S.C. 154(b) by 55 days.

(21) Appl. No.: 18/312,059

(22) Filed: May 4, 2023

(65) Prior Publication Data

US 2024/0370268 A1 Nov. 7, 2024

(51) Int. Cl.
*G06F 9/38* (2018.01)

(52) U.S. Cl.
CPC .......... *G06F 9/3834* (2013.01); *G06F 9/3832* (2013.01)

(58) Field of Classification Search
CPC .............................. G06F 9/383; G06F 9/3832
See application file for complete search history.

(56) References Cited

U.S. PATENT DOCUMENTS

| | | | | |
|---|---|---|---|---|
| 6,317,810 B1 * | 11/2001 | Lopez-Aguado | ..... | G06F 9/3455 711/131 |
| 6,430,680 B1 * | 8/2002 | Burky | .......... | G06F 9/3832 712/225 |
| 8,108,652 B1 * | 1/2012 | Hui | .......... | G06F 9/3012 712/4 |
| 2007/0106883 A1 * | 5/2007 | Choquette | .......... | G06F 9/3816 712/225 |
| 2008/0288751 A1 * | 11/2008 | Kocev | .......... | G06F 9/3455 712/E9.047 |
| 2009/0198965 A1 * | 8/2009 | Arimilli | .......... | G06F 9/30043 712/E9.033 |
| 2015/0058572 A1 * | 2/2015 | Olson | .......... | G06F 9/3824 711/125 |
| 2022/0300430 A1 * | 9/2022 | Abhishek Raja | ..... | G06F 9/3838 |

* cited by examiner

Primary Examiner — Keith E Vicary
(74) Attorney, Agent, or Firm — NIXON & VANDERHYE P.C.

(57) ABSTRACT

An apparatus with prefetching capabilities is provided in order to produce predictions of a memory address to be accessed by a load instruction in the future. An additional special cache is provided where pre-aligned data can be stored based on that prediction. When that load instruction is eventually received, the prediction can be confirmed and the pre-aligned data returned and loaded into a register file. In accordance with these techniques, the load instruction does not need to access the memory system nor perform alignment of the data before loading it into the register file. Hence the load instruction is performed faster than when loading data via a memory access. Further precautionary functionalities are also provided to manage the pre-aligned data to avoid the possibility of data corruption after a substantive change occurs to the state of memory.

16 Claims, 11 Drawing Sheets

| pre-aligned D$ | |
|---|---|
| dval_0 | [addr_0] |
| dval_1 | [addr_1] |
| dval_2 | [addr_2] |

FIG. 4A

| pre-aligned D$ | | |
|---|---|---|
| PC_0 | dval_0 | [addr_0] |
| PC_1 | dval_1 | [addr_1] |
| PC_2 | dval_2 | [addr_2] |

FIG. 4B

| pre-aligned D$ | | |
|---|---|---|
| #(PC_0+iter_0) | dval_0 | [addr_0] |
| #(PC_1+iter_1) | dval_1 | [addr_1] |
| #(PC_2+iter_2) | dval_2 | [addr_2] |

FIG. 4C

DATA VALUE PREDICTION AND PRE-ALIGNMENT BASED ON PREFETCHED PREDICTED MEMORY ACCESS ADDRESS

TECHNICAL FIELD

The present disclosure relates to data processing. In particular, the present disclosure relates to predicting the addresses of data being loaded from memory.

DESCRIPTION

A data processing apparatus arranged to perform data processing is often required to load data from memory in order to perform processing operations. To improve the speed of memory accesses, a data processing apparatus may be provided with a cache to store frequently accessed data in a more quickly accessible form. Data in a cache is typically arranged in cache lines corresponding to a set of bytes in memory.

While executing a program, a data processing apparatus may recognise a pattern of memory accesses such that the addresses of future memory accesses can be predicted. After a prediction is made, the cache can be pre-populated with data from a predicted address, so that when a memory access occurs, the required data is loaded more quickly from the cache instead of more slowly from the memory.

SUMMARY

In one example embodiment described herein there is an apparatus comprising:
prefetching circuitry configured to predict a predicted address expected to be indicated by a load instruction based on an iterative history of instructions, and to cause a cache line comprising a data value associated with the predicted address to be placed in a cache;
data pre-alignment circuitry configured to pre-align the data value based on the predicted address to generate a pre-aligned data value, wherein the pre-aligned data value is formatted for storage in a register to be specified by the future load instruction;
a pre-aligned data cache for storage of the pre-aligned data value in association with the predicted address; and
load handling circuitry configured to perform load operations in response to receiving load instructions, wherein
the pre-aligned data cache is configured to return the pre-aligned data value to the load handling circuitry in response to the load instruction indicating an address corresponding to the predicted address, and
the load handling circuitry is configured to suppress a memory access request specifying the address indicated by the load instruction in response to the pre-aligned data cache returning the pre-aligned data value.

In another example embodiment described herein there is a method comprising:
predicting a predicted address expected to be indicated by a load instruction based on an iterative history of instructions, and causing a cache line comprising a data value associated with the predicted address to be placed in a cache;
pre-aligning the data value based on the predicted address to generate a pre-aligned data value, wherein the pre-aligned data value is formatted for storage in a register to be specified by the future load instruction; and
storing the pre-aligned data value in association with the predicted address,
returning the pre-aligned data value in response to the load instruction indicating an address corresponding to the predicted address; and
suppressing a memory access request specifying the address indicated by the load instruction in response to returning the pre-aligned data value.

In another example embodiment described herein there is a non-transitory computer-readable medium to store computer-readable code for fabrication of an apparatus comprising:
prefetching circuitry configured to predict a predicted address expected to be indicated by a load instruction based on an iterative history of instructions, and to cause a cache line comprising a data value associated with the predicted address to be placed in a cache;
data pre-alignment circuitry configured to pre-align the data value based on the predicted address to generate a pre-aligned data value, wherein the pre-aligned data value is formatted for storage in a register to be specified by the future load instruction;
a pre-aligned data cache for storage of the pre-aligned data value in association with the predicted address; and
load handling circuitry configured to perform load operations in response to receiving load instructions, wherein
the pre-aligned data cache is configured to return the pre-aligned data value to the load handling circuitry in response to the load instruction indicating an address corresponding to the predicted address, and
the load handling circuitry is configured to suppress a memory access request specifying the address indicated by the load instruction in response to the pre-aligned data cache returning the pre-aligned data value.

BRIEF DESCRIPTION OF THE DRAWINGS

The present invention will be described further, by way of example only, with reference to embodiments thereof as illustrated in the accompanying drawings, in which:

FIGS. 4A, 4B and 4C illustrate configurations of the pre-aligned data cache according to some example embodiments;

DESCRIPTION OF EXAMPLE EMBODIMENTS

Figure 1:
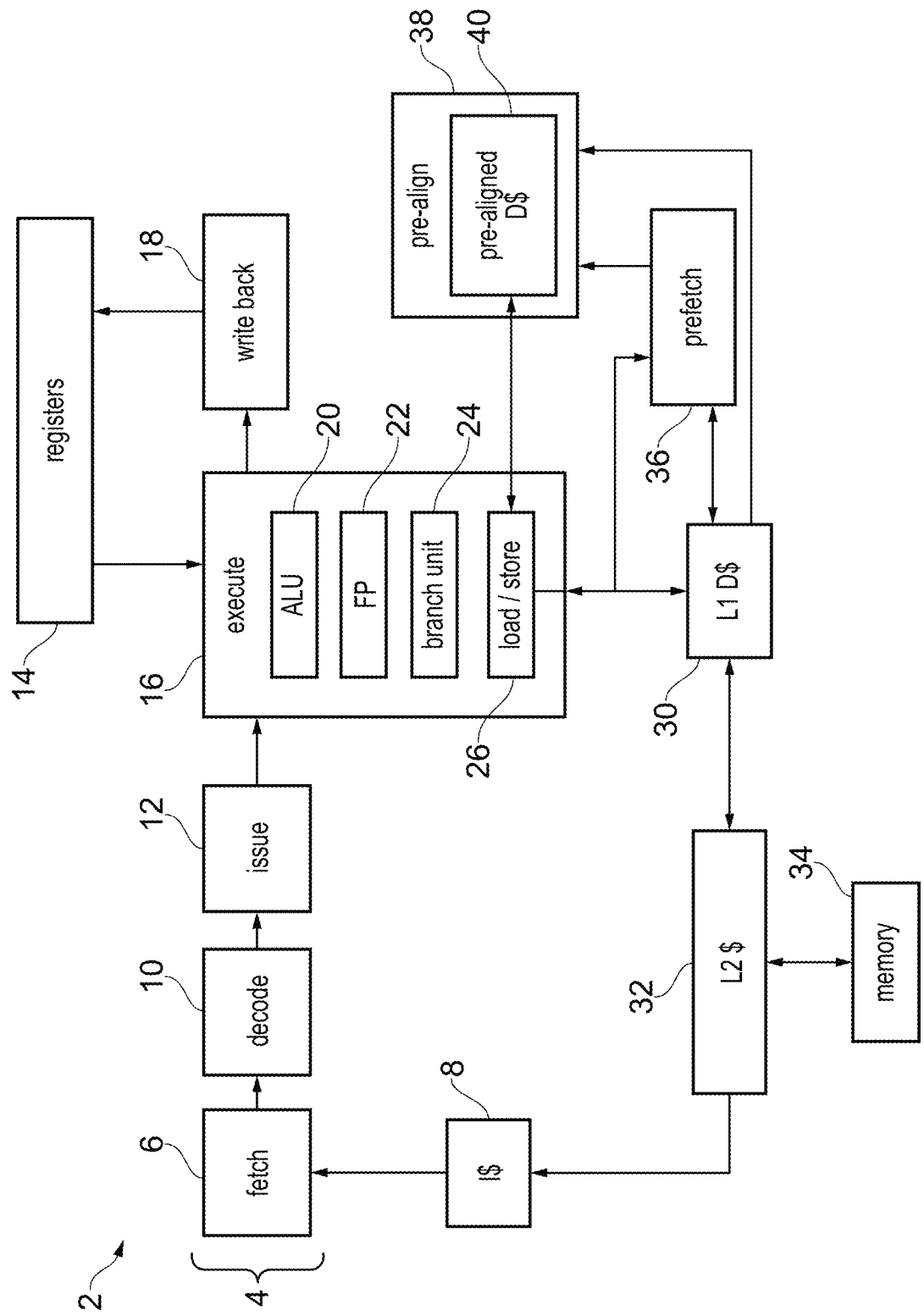
FIG. 1 schematically illustrates an apparatus according to some example embodiments.

Before discussing the embodiments with reference to the accompanying figures, the following description of embodiments is provided.

In accordance with one example configuration there is provided an apparatus comprising prefetching circuitry configured to predict a predicted address expected to be indicated by a load instruction based on an iterative history of instructions, and to cause a cache line comprising a data value associated with the predicted address to be placed in a cache; data pre-alignment circuitry configured to pre-align the data value based on the predicted address to generate a pre-aligned data value, wherein the pre-aligned data value is formatted for storage in a register to be specified by the future load instruction; a pre-aligned data cache for storage of the pre-aligned data value in association with the predicted address; and load handling circuitry configured to perform load operations in response to receiving load instructions, wherein the pre-aligned data cache is configured to return the pre-aligned data value to the load handling circuitry in response to the load instruction indicating an address corresponding to the predicted address, and the load handling circuitry is configured to suppress a memory access request specifying the address indicated by the load instruction in response to the pre-aligned data cache returning the pre-aligned data value.

During execution of a program, a data processing apparatus will typically make numerous accesses to memory in order to load or store data values at specified memory addresses. Some programs will have an iterative pattern of accesses to memory, such that the prefetching circuitry is capable of generating a prediction based on an iterative history corresponding to that pattern. In particular, the prefetching circuitry generates a memory address that is expected to be accessed by an instruction in the future, such as a load or a store. When the prefetching circuitry predicts a memory address (referred to as a 'predicted address' herein) that is expected to be indicated by a future load instruction, the prefetching circuitry issues a prefetch request to the memory system. The memory system is then caused to bring a cache line comprising the data at the predicted address into a cache. In some examples, the cache is one of a plurality of caches arranged in a hierarchy. It will be appreciated that the cache line may already be present in the cache when the prefetch request is issued, in which case the prefetch request does not need to be propagated through the memory system, or the cache line may be retrieved from another level of the cache hierarchy or from memory and then placed into the cache.

When a load instruction is executed, a load operation specifying a memory address causes an access to the memory system by load handling circuitry. The memory system may perform a series of lookups in a cache hierarchy or forward the request to memory in order to retrieve a cache line comprising the data value at the specified memory address. If the prefetching circuitry described above correctly predicted the load instruction, and the prefetch mechanism was completed in the required time window before execution of the load instruction, then a cache line comprising the required data value should be in the cache. Once the memory system has retrieved a cache line comprising the data value, an alignment process may be required before the data value can be loaded into a register. In particular, a memory system will transfer data in cache lines with a size (e.g. 64 bytes) that is considerably larger than that of a register (e.g. 32 bits). Further, the data within the cache line is aligned such that individual units of data are defined between boundaries at fixed memory address intervals (e.g. 4-byte intervals). If a load instruction specifies an un-aligned address (i.e. an address that does not align with a memory boundary), then an alignment process would be required in order to format the data correctly before being loaded into the register.

In accordance with the present techniques, the apparatus is provided with data pre-alignment circuitry configured to perform data pre-alignment based on the memory address predicted by the prefetching circuitry. In particular, the pre-alignment circuitry uses the predicted address to locate the data value within a prefetched cache line in the cache, and performs data pre-alignment before the load instruction is received. For example, if a register is configured to hold a 32-bit value, the data pre-alignment circuitry locates the data value based on the predicted address, and performs pre-alignment to generate a 32-bit 'pre-aligned' data value from the cache line. The pre-aligned data value is then temporarily held in a pre-aligned data cache in association with the predicted address.

Once the load instruction is received by the load handling circuitry, a determination is made as to whether the memory address specified in the load operation is the same as the predicted address. This serves to verify the prediction made by the prefetching circuitry and by extension to verify that the pre-aligned data value is correct. If the memory address specified in the load operation is the same as the predicted address, then the pre-aligned data cache is caused to return the pre-aligned data value to the load handling circuitry. The load handling circuitry may then load the pre-aligned data value directly into a register without needing to access the cache and perform the alignment process as described above. Hence, according to the present techniques, the access to the memory system is suppressed if the pre-aligned data cache returns the pre-aligned data value. Accordingly, data can be loaded into a register more quickly, thus improving performance.

In some examples, in response to the load instruction indicating an address that does not correspond to the predicted address, the pre-aligned data cache is configured to invalidate the pre-aligned data value. It will be appreciated that it is possible for the prefetching circuitry to generate a predicted address that is incorrect, and hence a pre-aligned data value generated based on that predicted address would also be incorrect. In such examples, the load handling circuitry will perform a load operation specifying a memory address that is different to the predicted address, and the pre-aligned data cache will not return the pre-aligned data value to the load handling circuitry, since this would provide an incorrect data value. Instead, the pre-aligned data cache invalidates the pre-aligned data value, and the load handling circuitry issues a memory access request to the memory system as described above.

In some examples, the data pre-alignment circuitry is configured to pre-align the data by performing at least one of: masking, bit-shifting, zero extending, and sign extending. Each of these functions may be used where necessary to generate the pre-aligned data value from the cache line. Masking allows a specific set of bits from the cache line to be separated from the rest. For example, bits from unnecessary parts of the cache line may all be set to zero or are not propagated along data lines. Bit-shifting shifts the bits of a particular data value to the right or the left. This may be used if the data value corresponds to part of a word in a cache line. The bits representing the data can be bit-shifted to represent the correct value, for example after a masking process sets all other bits to zero.

Zero extending and sign extending may each be used when the data value does not contain enough bits to fill a register. For example, an 8-bit unsigned data value of 241 (0b11110001) may be extracted from a 4-byte word (e.g. using masking/bit-shifting). However, for storage in a 32-bit register, the value must be extended to a 32-bit value. Zero-extending is used to add a series of 24 leading zeros to the data value. Accordingly, a 32-bit value is generated to represent the number 241. Similarly, sign extending adds a series of bits corresponding to the sign of the data value. For example, an 8-bit signed value of −11 using two's complement (0b11110101) would be extended with a series of 24 leading ones to generate a 32-bit value to represent −11.

In some examples, the pre-aligned data cache is indexed by a program counter value expected to be associated with the load instruction; and the pre-aligned data cache is configured to locate the pre-aligned data value based on a current program counter value associated with the load instruction. In such examples, the predicted address is predicted to be indicated by a load instruction at a particular program counter value. This program counter value is used to index the pre-aligned data value in the pre-aligned data cache. At the time that the load instruction is received by the load handling circuitry, the current program counter value can be used to locate a corresponding entry in the pre-aligned data cache, and to return the pre-aligned data value to the load handling circuitry.

In some examples, the prefetching circuitry is configured to track a number of iterations of the iterative history of instructions and to predict a predicted iteration value of a predicted iteration, wherein the load instruction is expected to be executed in the predicted iteration; the pre-aligned data cache is indexed by a hash value of a program counter value expected to be associated with the load instruction and the predicted iteration value; and the pre-aligned data cache is configured to locate the pre-aligned data value based on a hash value of a current program counter value and a current iteration value. In such examples, the prefetching circuitry is configured to predict that the load instruction will be received at a particular program counter value and at a particular number of iterations according to the iterative history. Both of these values are input into a hash function in order to generate a hash value used to index the pre-aligned data value in the pre-aligned data cache. At the time that the load instruction is received by the load handling circuitry, the current iteration value and the current program counter value is input into the same hash function to produce a hash value and to locate the corresponding entry in the pre-aligned data cache, and to return the pre-aligned data value to the load handling circuitry.

In some examples, there is provided store monitoring circuitry configured to monitor store operations performed by store handling circuitry, wherein in response to a store operation indicating the predicted address, the monitoring circuitry is configured to cause the pre-aligned data cache to invalidate the pre-aligned data value. In such examples, it is recognised that it is possible for a store instruction specifying the predicted address to be executed before the load instruction predicted by the prefetching circuitry is received. If that store instruction modifies the data value at the predicted address after the data pre-alignment circuitry has generated the pre-aligned data value, that pre-aligned data value would no longer be correct. Therefore, the store monitoring circuitry invalidates the pre-aligned data value that is stored in association with that predicted address in the pre-aligned data cache. When the load instruction is received, the load handling circuitry may then retrieve the data value by accessing the memory system as described above.

In some examples, in response to the store operation, the store monitoring circuitry is configured to cause the data pre-alignment circuitry to generate an updated pre-aligned data value based on a stored data value specified by the store operation; and the data pre-alignment circuitry is configured to store the updated pre-aligned data value in the pre-aligned data cache in association with the predicted address. If a pre-aligned data value is invalidated by the store monitoring circuitry as described above, the potential performance gain from returning the pre-aligned data value is lost. However, after the store instruction has been executed, the stored data value may be written into a cache line in the cache or placed in a store queue before being written to a cache line in the cache. Therefore, the data pre-alignment circuitry can obtain the stored data value and then generate an updated pre-aligned data value based on the stored data value. The updated pre-aligned data value is then stored in the pre-aligned data cache in association with the predicted address. In this way the potential performance gain from returning a pre-aligned data value is preserved.

In some examples, there is provided store handling circuitry configured to modify data at an instruction address of the load instruction, wherein in response to modifying the data at the instruction address of the load instruction, the store handling circuitry is configured to cause the pre-aligned data value to be invalidated. In such examples, it is recognised that it is possible for a modification to be made to a set of instructions in memory. In some examples, the instructions are moved from one region of memory to another by sub-processes on an execution platform, such as Java. In other examples, the instructions are modified by a just-in-time (JIT) compiler, which dynamically compiles and re-compiles code at run-time. When the store handling circuitry performs a store operation to modify data at a memory address, a signal indicating the memory address may be sent to the pre-aligned data cache. If the memory address is the same as an instruction address that is expected to contain the load instruction associated with a pre-aligned data value, then that pre-aligned data value is invalidated. Since the load instruction may not exist at that instruction address after the modification, it is not beneficial to retain a pre-aligned data value for that load instruction. Therefore, by invalidating the pre-aligned data value, the capacity of the pre-aligned data value can be used more efficiently.

In some examples, there is provided processing circuitry configured to perform data processing in response to instructions associated with one of a plurality of instances of software, wherein the pre-aligned data cache is configured to store the pre-aligned data value in association with an indicator corresponding to a current instance of software, wherein in response to the processing circuitry switching from the current instance of software to another one of the plurality of instances of software, the processing circuitry is configured to cause the pre-aligned data cache to invalidate the pre-aligned data value based on the indicator. For example, instances of software may include different applications, threads, or virtual machines being executed on the same processing circuitry. In order to keep track of which instance of software is being executed at any time, the processing circuitry holds an indicator, for example, in a configuration register. When the processing circuitry switches from one instance of software to another, the indicator is changed accordingly. The indicator may be used to control translation between virtual addresses and physical addresses, allowing for the possibility that the same virtual address would translate to different physical addresses for different instances of software. Therefore, a load instruction indicating a predicted virtual address may not correspond to the corresponding predicted physical address. As such, a pre-aligned data value generated based on a predicted physical address would be incorrect.

In such examples, when a pre-aligned data value is generated, it is stored in the pre-aligned data cache in association with the indicator corresponding to the current instance of software (i.e. the instance of software that is being executed when the pre-aligned data value was generated). When the processing circuitry performs a context switch and updates the indicator in the configuration register, the pre-aligned data cache is caused to invalidate one or more of the pre-aligned data values stored in association with the previous indicator. In some examples, the pre-aligned data cache invalidates all of the pre-aligned data values stored in association with the previous indicator. This prevents the possibility of returning an incorrect pre-aligned data value to load handling circuitry.

In some examples, the indicator is an application specific identifier, or ASID. In such examples, an ASID is used to indicate particular instances of software. Hence pre-aligned data values may be stored in the pre-aligned data cache in association with an ASID corresponding to the current instance of software.

In some examples, there is provided filter circuitry configured to suppress generation of the pre-aligned data value by the data pre-alignment circuitry in response to a store instruction specifying the predicted address being predicted to occur before the load instruction. In such examples, an additional prediction is made, for example by the prefetching circuitry and based on the iterative history, that a store instruction indicating the same predicted address as the load instruction will be received before the load instruction. It is recognised that a pre-aligned data value generated based on that predicted address would likely be incorrect after the store instruction is executed. Therefore, generating the pre-aligned data value is unnecessary. The filter circuitry acts to suppress that generation, so that the pre-aligned data cache is not populated will pre-aligned data values that are known to be incorrect. Since unnecessary pre-aligned data values are not generated, the pre-aligned data cache may be made smaller, allowing for faster look-ups and less circuit area being required for implementation.

In some examples, the prefetching circuitry is responsive to a determination of whether the cache line comprising the data value is currently in the cache; wherein in response to a determination that the cache line is currently in the cache, the prefetching circuitry is configured to cause the data pre-alignment circuitry to pre-align the data value based on the predicted address; and in response to a determination that the cache line is not currently in the cache, the prefetching circuitry is configured to suppress the data pre-alignment circuitry until the cache line has been placed in the cache. The determination of whether the cache line comprising the data value is current in the cache may be performed by the prefetching circuitry or by the cache itself. The prefetching circuitry is then able to trigger the data pre-alignment circuitry depending on whether the cache line is in the cache or not. In this way, cache traffic may be reduced, since the data pre-alignment circuitry will not unnecessarily access the cache when the cache line has not been placed in the cache yet. Instead, the data pre-alignment circuitry will only access the cache to generate the pre-aligned data value once the cache line is known to have been placed in the cache.

In accordance with another example configuration there is provided a method comprising predicting a predicted address expected to be indicated by a load instruction based on an iterative history of instructions, and causing a cache line comprising a data value associated with the predicted address to be placed in a cache; pre-aligning the data value based on the predicted address to generate a pre-aligned data value, wherein the pre-aligned data value is formatted for storage in a register to be specified by the future load instruction; and storing the pre-aligned data value in association with the predicted address, returning the pre-aligned data value in response to the load instruction indicating an address corresponding to the predicted address; and suppressing a memory access request specifying the address indicated by the load instruction in response to returning the pre-aligned data value.

In accordance with another example configuration there is provided a non-transitory computer-readable medium to store computer-readable code for fabrication of an apparatus comprising: prefetching circuitry configured to predict a predicted address expected to be indicated by a load instruction based on an iterative history of instructions, and to cause a cache line comprising a data value associated with the predicted address to be placed in a cache; data pre-alignment circuitry configured to pre-align the data value based on the predicted address to generate a pre-aligned data value, wherein the pre-aligned data value is formatted for storage in a register to be specified by the future load instruction; a pre-aligned data cache for storage of the pre-aligned data value in association with the predicted address; and load handling circuitry configured to perform load operations in response to receiving load instructions, wherein the pre-aligned data cache is configured to return the pre-aligned data value to the load handling circuitry in response to the load instruction indicating an address corresponding to the predicted address, and the load handling circuitry is configured to suppress a memory access request specifying the address indicated by the load instruction in response to the pre-aligned data cache returning the pre-aligned data value.

Particular embodiments will now be described with reference to the figures.

FIG. 1 schematically illustrates an example of a data processing apparatus 2. The data processing apparatus 2 has a processing pipeline 4, which includes a number of pipeline stages. In this example, the pipeline stages include a fetch stage 6 for fetching instructions from memory 34 to be locally cached in an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage 16. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the processing units may include: an arithmetic/logic unit (ALU) 20 for performing arithmetic or logical operations; a floating-point unit 22 for performing operations on floating-point values; a branch unit 24 for evaluating the outcome of branch operations and adjusting the program counter accordingly; and a load/store unit 26 for performing load/store operations to access data in a memory system 8, 30, 32, 34. In this example, the memory system includes a level one (L1) data cache 30, the L1 instruction cache 8, a shared level two (L2) cache 32 and main system memory 34. It will be appreciated that this is just one example of a possible cache hierarchy and other arrangements of caches can be provided. The specific types of processing unit 20 to 26 shown in the execute stage 16 are also just one example, and other implementations may have a different set of processing units or could include multiple instances of the same type of processing unit, so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
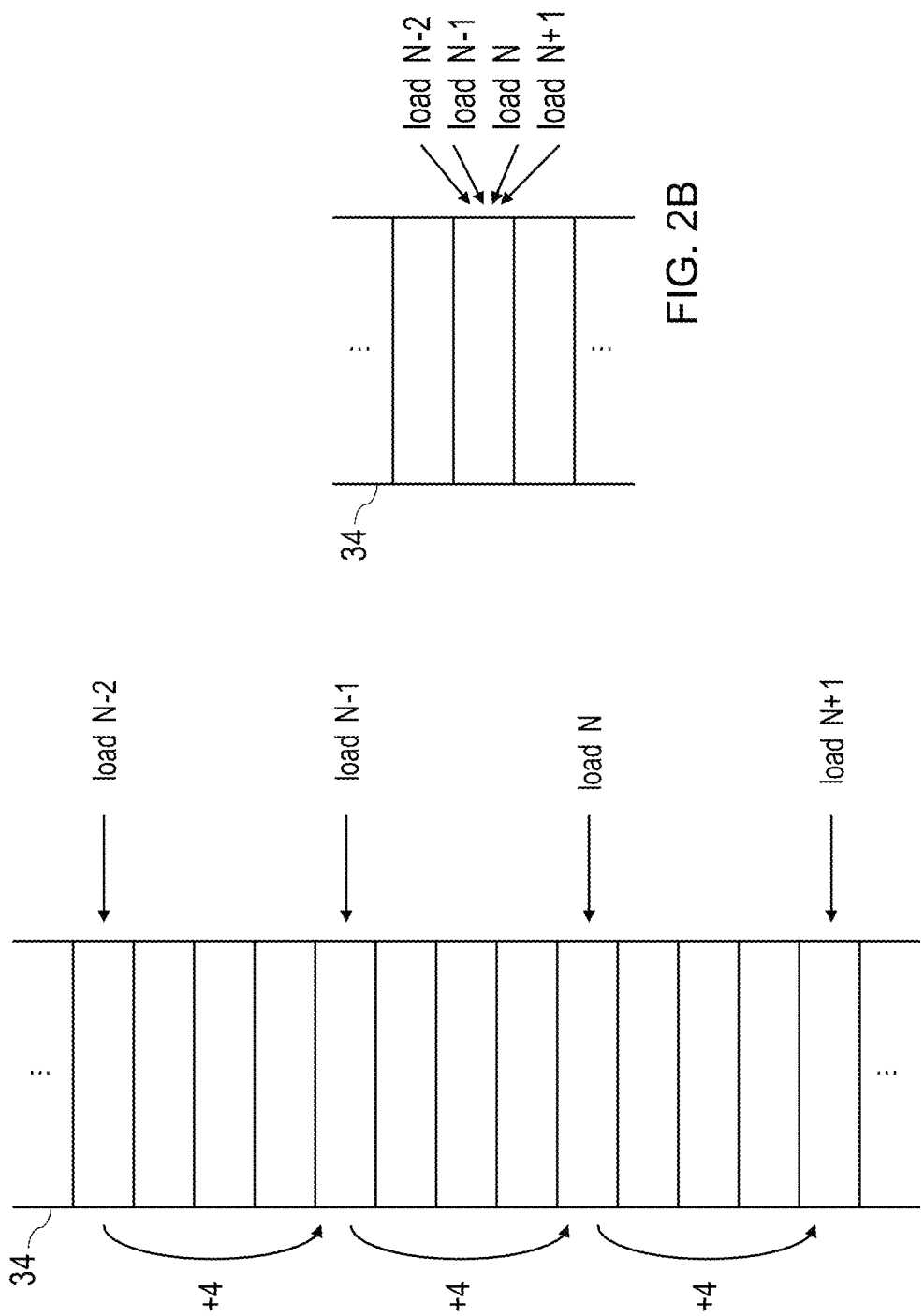
FIGS. 2A and 2B illustrate examples of an iterative history of memory accesses.

In accordance with the present techniques, the apparatus 2 is provided with a prefetcher 36 for analysing patterns of target addresses specified by memory access requests issued by the load/store unit 26, and detecting address access patterns which can subsequently be used to predict addresses of future memory accesses. One example of such an address access pattern is when memory is accessed iteratively. A stride sequence is a sequence of addresses where the addresses are separated at regular intervals of a constant stride value. FIG. 2A illustrates such a pattern of memory accesses, where previous memory accesses (load N−2, load N−1) and a current access (load N) are each separated by a constant stride value of 4. Therefore, the prefetcher 36 is capable of predicting that the next memory access (load N+1) would continue with a stride value of 4. Alternatively, a program may repeatedly access the same memory address in each iteration. FIG. 2B illustrates such a pattern of memory accesses, where previous memory accesses (load N−2, load N−1) and a current access (load N) are each made to the same memory address. Therefore, the prefetcher 36 is capable of predicting that the next memory access (load N+1) would be to the same memory address again. It will be appreciated that the prefetcher 36 is not limited to predicting the next memory access, and may also be configured to predict a memory access much further into the future (e.g. load N+20).

In addition to predicting the memory address of the next memory access, the prefetcher 36 also predicts when that memory access will occur. In particular, the prefetcher 36 may analyse a pattern of program counter (PC) values associated with the previous memory accesses. For an iterative history (e.g. where code is being executed in an iterative loop), the pattern of PC values will likely show a regular interval between each memory access. Therefore, this interval may be used to predict the PC value at which a predicted memory access will occur. In some examples, the prefetcher 36 may also analyse the iterative history in order to determine a number of iterations that have previously occurred, and may predict the number of iterations before the predicted memory access will occur.

The prefetcher 36 maintains prefetch state information representing the observed address access patterns, and uses the prefetch state information to generate prefetch requests, which are issued to the memory system to request that data is brought into a given level of cache (e.g. the L1 data cache 30 or L2 cache 32). The prefetch requests are not directly triggered by a particular instruction executed by the pipeline 4, but are issued speculatively with the aim of ensuring that when a subsequent load/store instruction reaches the execute stage 16, the data it required may already be present within one of the caches, thus speeding up the processing of that load/store instruction and therefore reduce the likelihood that the pipeline has to be stalled.

The prefetcher 36 may be able to perform prefetching into a single cache or into multiple caches. For example, FIG. 1 shows an example of the prefetcher 36 configured to issue prefetch requests to the L1 data cache 30, which are propagated to the L2 cache 32 or downstream to memory 34 and requests that data from a predicted address is brought into the L1 data cache 30. It will be appreciated that, in other examples, the prefetcher 36 could additionally or alternatively issue prefetch requests to the L2 cache 32, causing data from a predicted address to be brought into the L2 cache 32. In some examples, the prefetcher 36 determines which level of cache to issue the prefetch request to depending on how far in the future the prefetcher 36 is predicting. For example, when looking further into the future, the prefetch request may be sent to lower levels of cache.

As well as the target addresses issued by the load/store unit 26, the training of the prefetcher 36 may also be based on an indication of whether the corresponding memory access requests hit or miss in the L1 data cache 30. The hit or miss indication can be used for filtering the target address from training. This recognises that if it is already known that the target address would hit in the cache, then it is not necessary to carry out the prefetch functionality described above. Performance improvement can be greater in focusing prefetcher training on those addresses which, in the absence of prefetching, would have encountered cache misses for the demand access requests. This is not to say that the prefetcher 36 would not still predict an address for a predicted memory access, but rather the prefetch request is not issued in response to a determination that the cache line would already be present in the cache.

The apparatus 2 is also provided with data pre-alignment circuitry 38 for pre-aligning data based on data stored in the L1 data cache 30 or L2 cache 32. The data pre-alignment circuitry 38 receives the predicted address from the prefetcher 36, and is capable of reading a cache line from the L1 data cache 30. In particular, the data pre-alignment circuitry 38 locates a data value in the cache line based on the predicted address, and generates a pre-aligned data value based on that data value. The pre-alignment that is necessary may be determined by alignment requirements defined as part of the load instruction predicted by the prefetcher 36. The pre-aligned data value is then stored in the pre-aligned data cache 40 in association with the predicted address. In some examples, the pre-aligned data cache 40 is significantly smaller, both in terms of capacity and circuit area, than the L1 data cache 30. In particular, where the pre-aligned data cache 40 holds pre-aligned data values that are formatted for storage in a register, each entry only needs to have a capacity equal to the size of the register plus the size of a memory address or a memory address tag.

Figure 3:
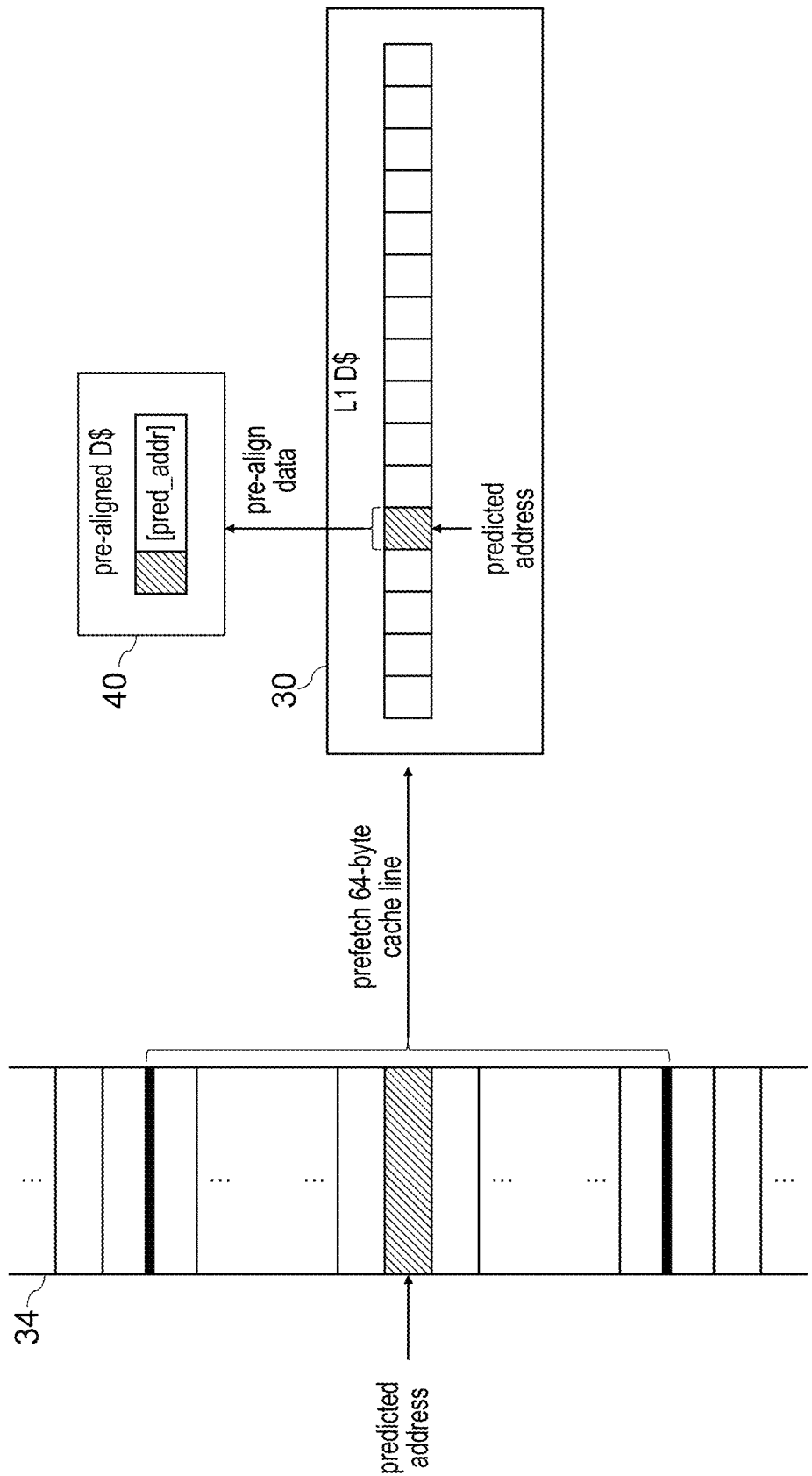
FIG. 3 illustrates the functionality of data pre-alignment circuitry according to some example embodiments.

The pre-aligned data value corresponds to the bits that would actually be stored into a register in response to a load instruction. FIG. 3 schematically illustrates how the pre-aligned data value is generated from the data value stored in memory. The prefetcher 36 predicts that a load instruction will indicate a predicted memory address (indicated by the hatched region of the memory 34). In this example, the memory system is configured to move data in cache lines of 64 bytes defined between boundaries arranged in the memory (indicated by the thicker lines). The prefetcher 36 issues a prefetch request specifying the predicted address, causing a 64-byte cache line including the data value stored at the predicted address to be placed in the L1 data cache 30. It will be appreciated that the L1 data cache 30 will typically contain a number of cache lines depending on the particular implementation, but only one cache line is shown in the L1 data cache 30 in FIG. 3 for a clear explanation.

When a data value is accessed in the cache, the memory address defines the location of the data value within the cache line. The data pre-alignment circuitry 38 accesses the L1 data cache 30 using the predicted address received from the prefetcher 36. Based on the predicted address and the alignment requirements of the predicted load instruction, the data pre-alignment circuitry 38 locates the data value that is expected to be required by the load instruction predicted by the prefetcher 36 and performs data pre-alignment in order to generate a pre-aligned data value.

When generating a pre-aligned data value, the data pre-alignment circuitry may perform a number of different operations according to the alignment requirements of the predicted load instruction. For example, masking may be used to extract an un-aligned data value from within a data unit (e.g. a word), and bit-shifting, zero extending, or sign extending may be used to configure the data value into a format that can be stored into a register of the register file 12. In the example of FIG. 3, the register is configured to hold a 32-bit value, hence the data pre-alignment circuitry 38 is configured to generate the pre-aligned data value as a 32-bit value. That 32-bit value is then stored in the pre-aligned data cache 40 in association with the predicted address ("pre-d_addr"). It will be appreciated that only one entry is shown in the pre-aligned data cache 40 for a clear illustration, but the pre-aligned data cache 40 may store a plurality of entries, each containing different pre-aligned data values stored in association with different predicted addresses.

In some examples, the data pre-alignment circuitry 38 is configured to automatically generate the pre-aligned data value in response to the prefetcher 36 predicting a memory address. In other examples, the data pre-alignment circuitry 38 is explicitly triggered by the prefetcher 36 in response to a determination that the cache line is in the L1 data cache 30. In such examples, the data pre-alignment circuitry 38 only accesses the L1 data cache 30 once instead of attempting to read the cache line when it has not yet been fetched from memory 34.

Returning to FIG. 1, when a load instruction is received by the execute stage 16, a memory address is generated according to the address indicated by the load instruction. This generated address is used by the load/store unit 26 to issue a memory access request to the memory system (e.g. to the L1 data cache 30). The pre-aligned data cache 40 is configured to interface with the load/store unit 26, and in response to the load instruction being received, it is determined whether the generated address matches a predicted address associated with a pre-aligned data value.

The determination may be performed in a number of ways depending on how the pre-aligned data cache 40 is configured to arrange the pre-aligned data values. FIGS. 4A-4C illustrate some example configurations. In examples such as FIG. 4A, the pre-aligned data values (dval) are stored in association with respective predicted addresses (addr). When a load instruction is executed and a memory address is generated, a lookup is performed in the pre-aligned data cache 40 specifying the generated address. Each entry in the pre-aligned data cache 40 is then compared with the generated address to determine if there is a matching entry.

In examples such as FIG. 4B, the pre-aligned data cache 40 is indexed by a PC value at which the prefetcher 36 has predicted that the load instruction will be received. When a load instruction is being executed, the current PC value can be used to quickly locate an entry in the pre-aligned data cache 40. If an entry at the correct PC value is located, then a comparison between the predicted address and the generated address is performed to verify that the entry matches. In the example of FIG. 4B, the determination is performed more quickly, since only one comparison is required.

In examples such as FIG. 4C, the pre-aligned data cache 40 is indexed using a hash value of the PC value and a value indicating the iteration that the prefetcher 36 has predicted that the load instruction will be received. Similarly, when the load instruction is executed, the same hash function is used to generate a hash value of the current PC value and the current iteration value to quickly locate an entry in the pre-aligned data cache 40. If an entry at the correct hash is located, then a comparison between predicted address and the generated address is performed to verify that the entry matches. Similar to the above, the determination is performed more quickly since only one comparison is required.

According to any of the above examples, if it is determined that the generated address does match a predicted address associated with a pre-aligned data value, then the prediction made by the prefetcher 36 is confirmed to be correct. Accordingly, the pre-aligned data cache 40 is configured to return the pre-aligned data value to the load/store unit 26, thus providing the data value required by the load instruction without needing to access the L1 data cache 30. The load/store unit 26 suppresses an access to the L1 data cache 30 and causes the pre-aligned data value to be written into the register file 14 via the write-back stage 18 in the same way as though the access to the L1 data cache 30 had been performed.

If, however, it is determined that the generated address and the predicted addresses do not match, either by not locating a matching entry after performing a lookup, or an indexed entry not including a matching address, then the prediction made by the prefetcher 36 was incorrect. Accordingly, the pre-aligned data value would also be incorrect and so it is not returned to the load/store unit 26. Instead, the pre-aligned data value is invalidated, and the load/store unit 26 issues the memory access to the memory system to load a data value corresponding to the generated address.

According to the present techniques, the generation of pre-aligned data values presents an opportunity for an improvement in performance. In particular, un-aligned data values in a cache line are pre-aligned speculatively prior to receiving the load instruction. This allows the load/store unit 26 to load the data into a register without requiring an alignment process after receiving the load instruction. Hence the data can be loaded more quickly. Additionally, if a prediction is incorrect, the only disadvantage is a small circuit area/power wastage, and a lost opportunity for performance gain rather than a performance penalty. In particular, if the prediction was incorrect, the load/store unit 26 would have been required to issue a memory access request and incur the necessary latency in any event. However, it will be appreciated that for highly iterative programs a prefetcher 36 is likely to accurately predict the majority of memory accesses, and hence the present techniques will accordingly improve performance of those memory accesses.

Figure 5:
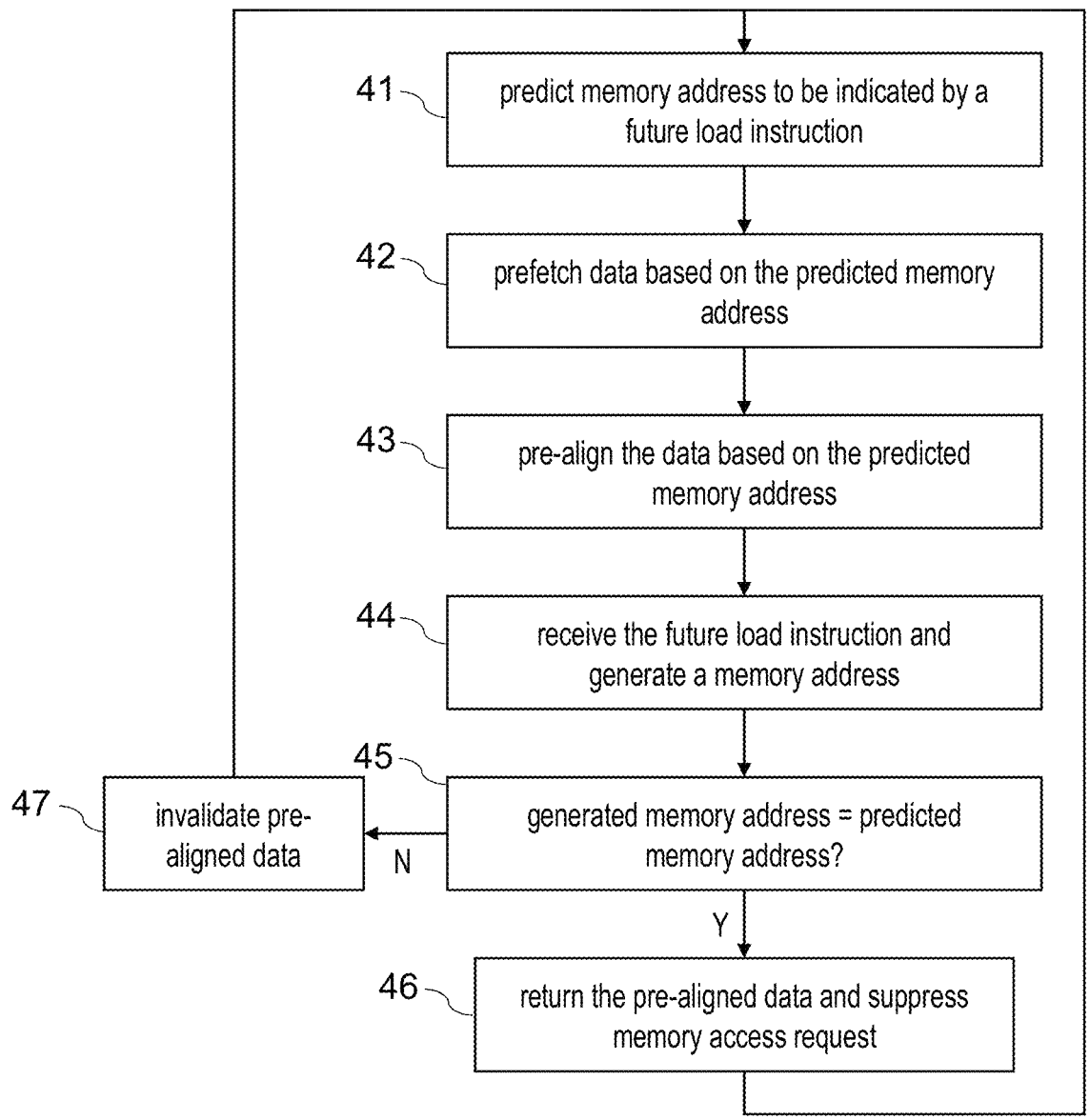
FIG. 5 shows a sequence of steps to generate pre-aligned data according to some example embodiments.

FIG. 5 illustrates a method in accordance with the present techniques. The method begins at step 41 when the prefetcher 36 predicts a memory address expected to be indicated by a future load instruction. At step 42, the prefetcher 36 issues a prefetch load request to the L1 data cache 30, causing the data value at the predicted memory address to be placed in the L1 data cache 30. At step 43, the data value is pre-aligned based on the predicted memory address and the alignment requirements of the load instruction by the data pre-alignment circuitry 38. The pre-aligned data value is then placed in the pre-aligned data cache 40 in association with the memory address predicted. At step 44, the load instruction predicted by the prefetcher 36 is received, and a memory address is generated. At step 45, the generated memory address is compared to the predicted memory address of the pre-aligned data value. If the generated memory address corresponds to the predicted memory address, then at step 46, the pre-aligned data value is returned to the load/store unit 26, and the memory access request is suppressed. If the generated memory address does not correspond to the predicted memory address, then at step 47, the pre-aligned data is invalidated. After either of step 46 or step 47, the process resets to await a new prediction by the prefetcher 36.

It is recognised that a pre-aligned data value only corresponds to the state of memory 34 at the time when the pre-alignment circuitry 38 generates the pre-aligned data value. However, during the time before the predicted load instruction is executed, it is possible for the state of memory 34 to be changed, causing the pre-aligned data value to be incorrect.

Figure 6:
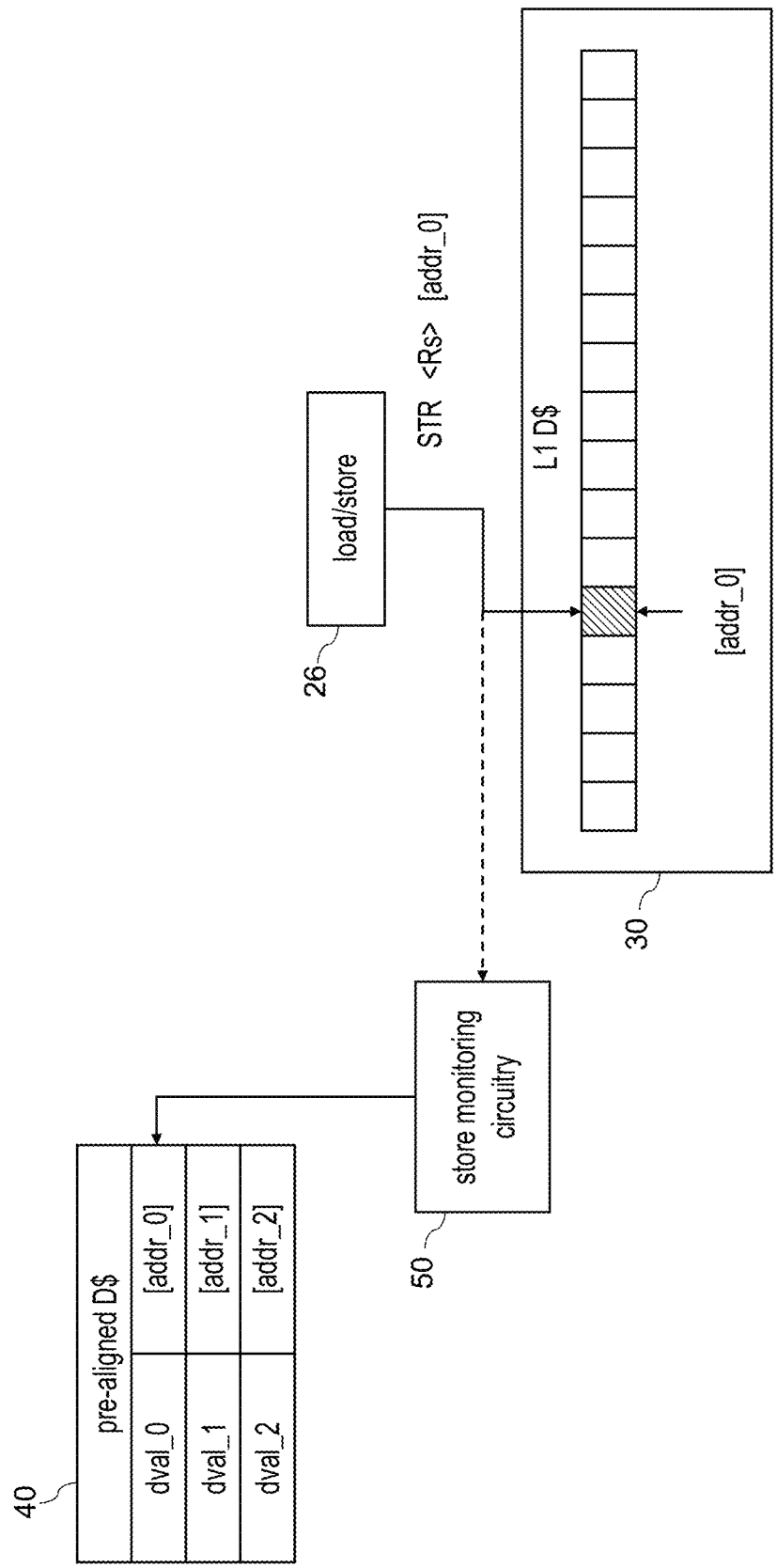
FIG. 6 illustrates the functionality of store monitoring circuitry according to some example embodiments.

In some examples, the state of memory 34 is changed by an intervening store instruction being executed after the pre-aligned data value has been generated, but before the load instruction predicted by the prefetcher 36 has been executed. FIG. 6 illustrates an example of store monitoring circuitry 50, which is configured to monitor store operations performed by the load/store unit 26. In particular, the store monitoring circuitry 50 monitors the memory addresses specified by the store operations, and determines whether the a store operation specifies a memory address that matches the predicted address associated with a pre-aligned data value in the pre-aligned data cache 40.

In the example of FIG. 6, the load/store unit is performing a store operation by storing the data from a source register "Rs" to a memory address "addr_0". The store monitoring circuitry determines that addr_0 matches the predicted address of one of the pre-aligned data values (i.e. "dval_0") in the pre-aligned data cache 40. In this scenario, dval_0 would be recognised as being incorrect Therefore, the store monitoring circuitry 50 is configured to cause the pre-aligned data cache 40 to invalidate dval_0 in response to store operation and the pre-aligned data cache 40 does not return the pre-aligned data value to the load/store unit 26.

In some examples, the store monitoring circuitry 50 triggers the data pre-alignment circuitry 38 to generate an updated pre-aligned data value based on the new data value stored by the store operation. In some such examples, the data pre-alignment circuitry 38 locates the new data value in the cache line of the L1 data cache 30 based on the same predicted address, and generates the pre-aligned data value in the same way as in previous examples. In examples that implement a store queue configured to contain values to be written to memory, the data-alignment circuitry 38 may read the new data value from the store queue, and generates the pre-aligned data value without accessing the L1 data cache 30. By generating an updated pre-aligned data value, the performance advantages of generating pre-aligned data values is preserved.

Figure 7:
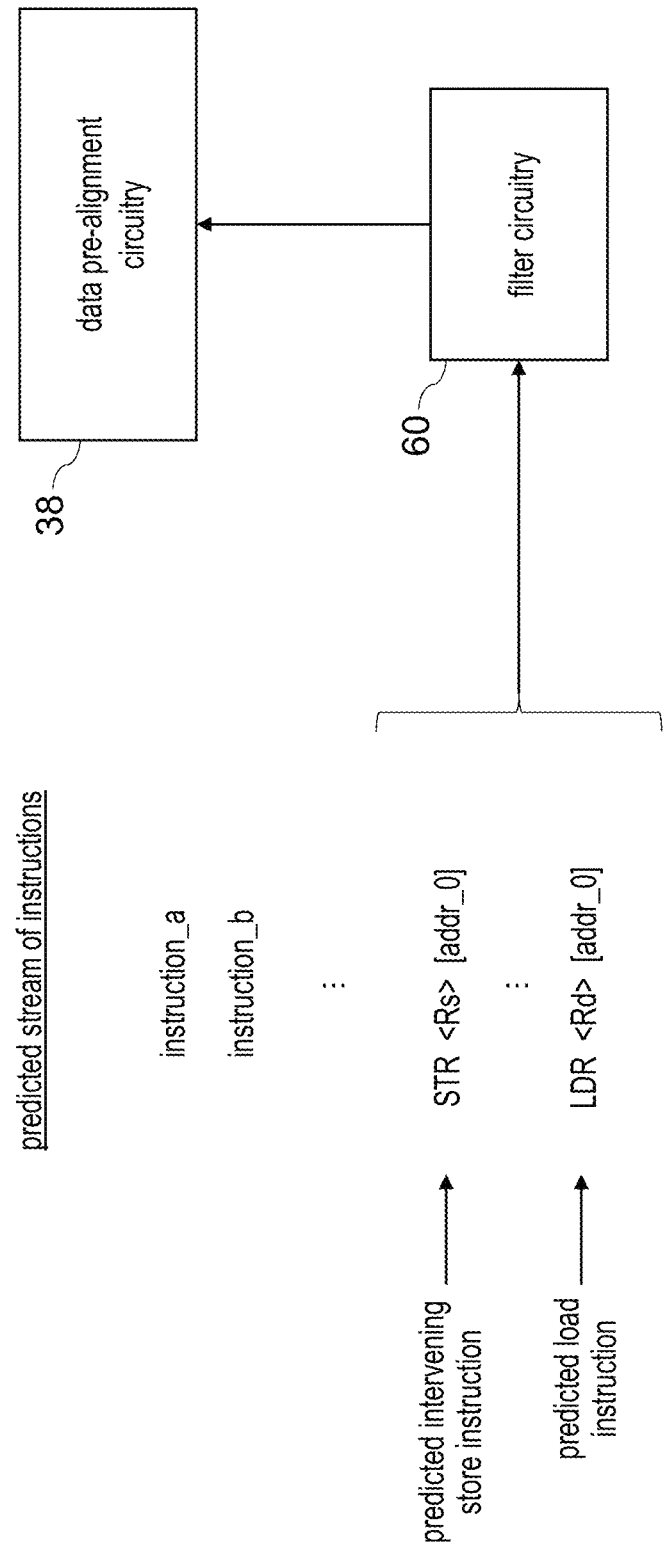
FIG. 7 illustrates the functionality of filter circuitry according to some example embodiments.

In some examples, the intervening store instruction is part of the iterative history that is analysed by the prefetcher 36 to generate predictions. As a result, the prefetcher 36 may predict that the intervening store instruction will be received before the predicted load instruction. FIG. 7 illustrates a predicted stream of instructions including various instructions ('instruction_a', 'instruction_b') that are predicted to occur based on the iterative history of instructions. The prefetcher 36 further predicts an intervening store instruction to store data from a source register "Rs" to the memory address "addr_0". The prefetcher 36 still further predicts a load instruction to load data from the same memory address to be stored in destination register "Rd". It is recognised that in this scenario, a pre-aligned data value generated by the data pre-alignment circuitry 38 based on data currently stored at addr_0 would be expected to be invalid by the time the load instruction is received. Therefore doing so would likely be a waste of the available capacity in the pre-aligned data cache 40.

In the example of FIG. 7, there is provided filter circuitry 60 configured to analyse the sequence of predicted instructions generated by the prefetcher 36. In response to detecting the matching memory addresses expected to be specified by the store instruction and the load instruction, the filter circuitry 60 issues a signal to the data pre-alignment circuitry 38 to suppress the generation of a pre-aligned data value.

In some examples, the state of memory 34 is changed by a modification to the predicted load instruction itself. Such a change is likely to be made by a process that is separate from the program itself. For example, a just-in-time (JIT) compiler is a process that compiles computer code at runtime. A JIT compiler may identify parts of the program code that may be optimised while the program is being executed, and then modifies the instructions in the memory 34 before they are executed (e.g. the predicted instruction may be moved such that it is executed at a different program counter value). Another example of a change to the predicted load instruction is when using particular programming platforms that include internal processes for runtime optimisation. For example, a Java virtual machine includes a so-called 'garbage collector' algorithm configured to move data in order to optimise memory 34 while a program is running. Such an algorithm may include moving the instructions of a program in a region of memory 34 to another region of memory 34.

Figure 8:
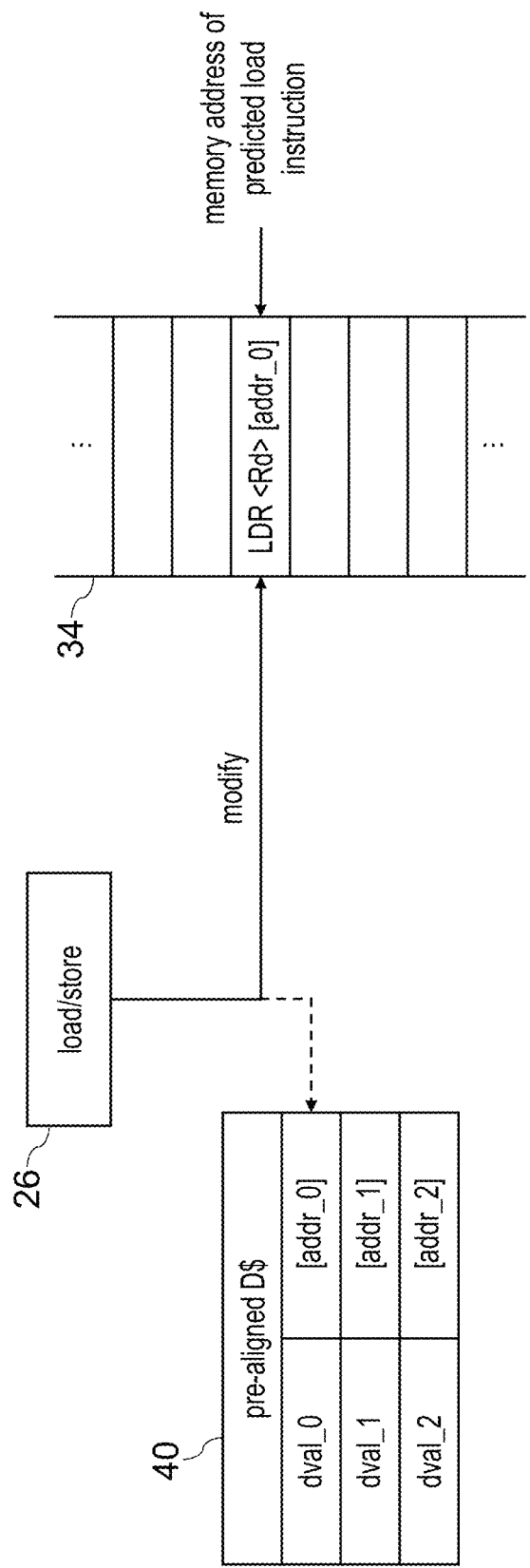
FIG. 8 illustrates the functionality of a load/store unit according to some example embodiments.

FIG. 8 schematically illustrates an example where the load/store unit 26 modifies data at an instruction address corresponding to the load instruction predicted by the prefetcher 36. In particular, the prefetcher 36 has predicted a load instruction to load a data value from 'addr_0' to a destination register "Rd". In accordance with the present techniques, a pre-aligned data value 'dval_0' has been generated to correspond to the data value at addr_0. The load/store unit 26 performs a modification to the instruction at the instruction address, for example by overwriting or moving the instruction to a different region of memory 34. When performing the modification, the load/store unit 26 is configured to generate a signal to the pre-aligned data cache 40 to cause the pre-aligned data value corresponding to the load instruction to be invalidated. In order to determine which pre-aligned data value should be invalidated, some examples of the pre-aligned data cache 40 includes may include an indication of the instruction address of the predicted instruction in each entry.

Figure 9:
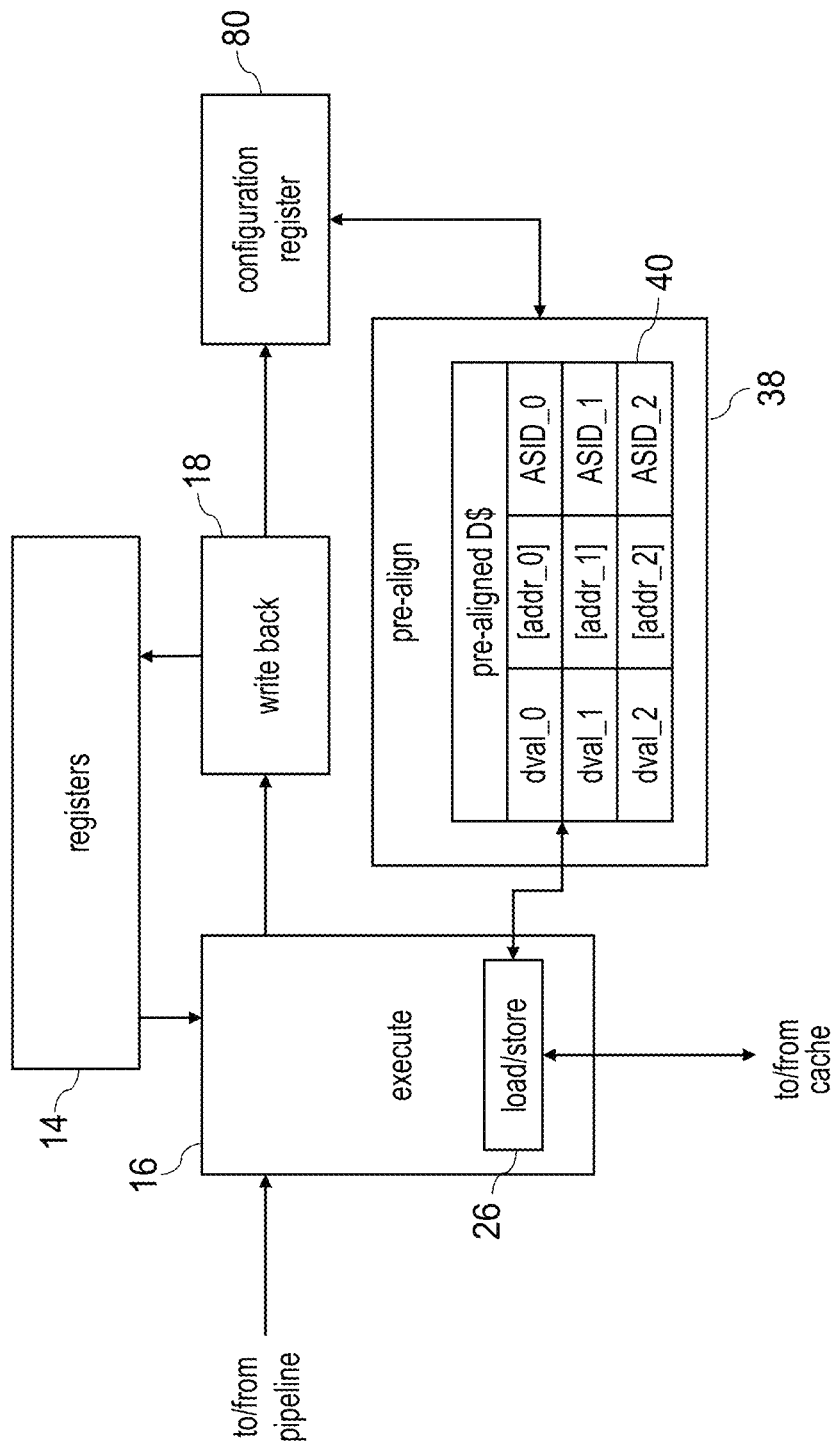
FIG. 9 schematically illustrates part of an apparatus according to some example embodiments.

In some examples, the state of memory is changed when the data processing apparatus 2 changes from executing one set of instructions to another. In particular, some examples of the data processing apparatus 2 are capable of executing instructions associated with one of a plurality of instances of software, such as different applications, threads, or virtual machines. FIG. 9 schematically illustrates part of the data processing apparatus 2 in such examples. The data processing apparatus 2 is further provided with a configuration register 80, in which an indicator corresponding to the current instance of software is stored by the write-back stage 18. The indicator may comprise an application-specific identifier (ASID) or a virtual-machine identifier (VMID). Whenever the data processing apparatus 2 switches to a different instance of software, the indicator is changed to correspond with the new instance of software. An indicator corresponding with particular instances of software may have several different uses, including managing memory accesses depending on a security state of the instances of software or for configuring memory address translation.

It is recognised that when the data processing apparatus 2 switches from one instance of software to another, it would not necessarily be known when the data processing apparatus 2 would switch back. Therefore, the load instruction that was predicted by the prefetcher 36 may not be encountered for some time. In such cases, it would be a waste of capacity in the pre-aligned data cache 40 to retain pre-aligned data values generated during the previous instance of memory. Moreover, if the indicator controls how a virtual address is translated to a physical address (e.g. by defining a page table), a load instruction specifying a memory address that appears to match the predicted address might be encountered, when in fact the memory address would be translated to specify an entirely different region of memory. Returning the pre-aligned data value in such an example presents a risk of data corruption.

Therefore, in the example of FIG. 9, the pre-aligned data cache 40 is configured to store the pre-aligned data value in association with the indicator (an ASID in this example) stored in the configuration register 80 at the time that the pre-aligned data values are generated. It will also be appreciated that the pre-aligned data cache 40 could be indexed as in FIGS. 4B and 4C in addition to storing the indicator. If the data processing apparatus 2 switches to a different instance of software, such that the indicator in the configuration register 80 no longer corresponds to the indicators stored in the pre-aligned data cache, one or more pre-aligned data values associated with the previous indicator is invalidated. Indeed, in some such examples all of the pre-aligned data values associated with the previous indicator are invalidated. This allows for new pre-aligned data values to be generated for the current instance of software, thus making more efficient use of the pre-aligned data cache 40 and preventing data corruption as described above.

Figure 10:
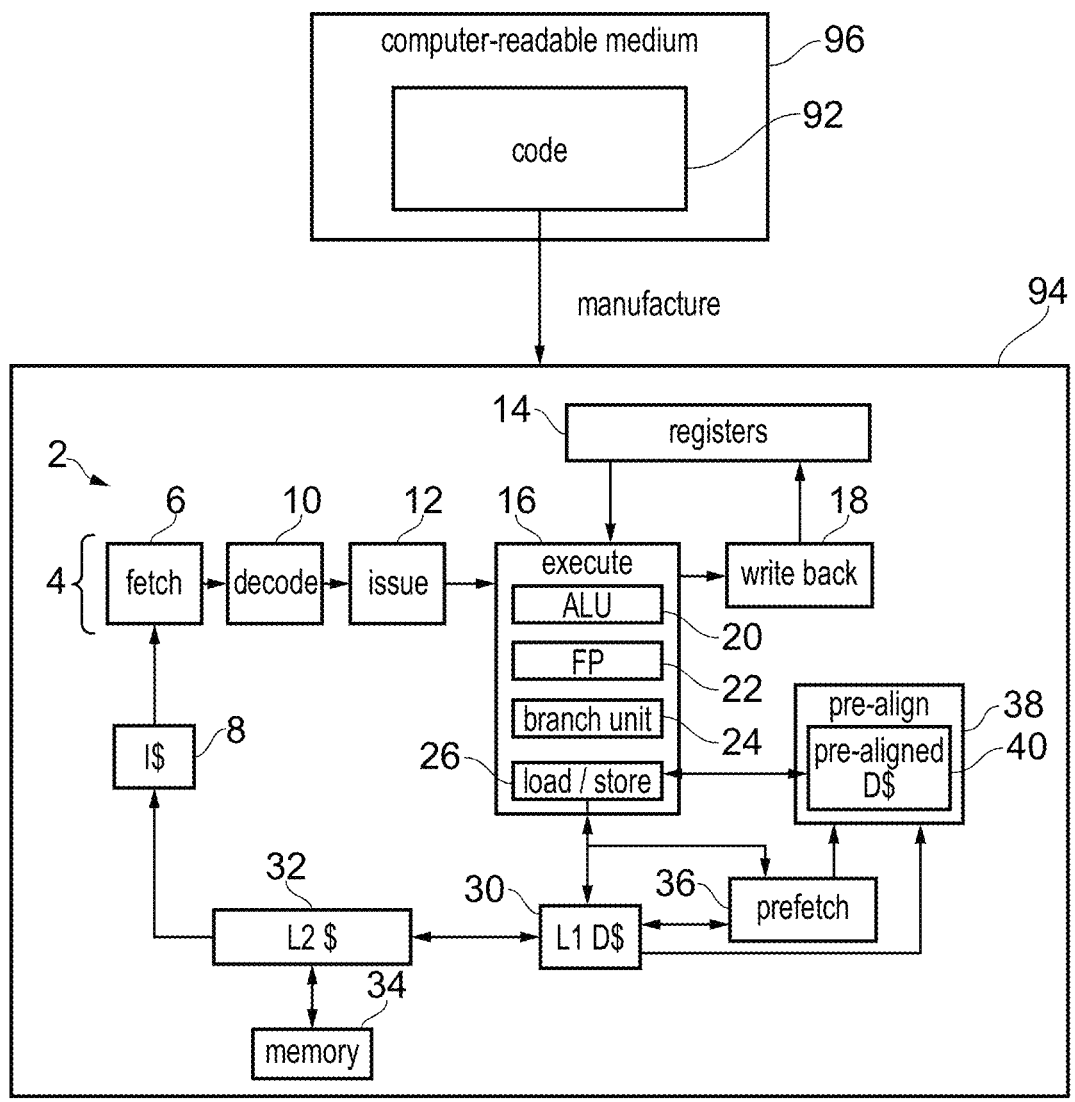
FIG. 10 schematically illustrates a computer-readable medium comprising computer-readable code for manufacturing an apparatus according to some example embodiments.

FIG. 10 illustrates an example of concepts described herein embodied in computer-readable code 92 for fabrication of an apparatus 94 that embodies the described concepts. For example, the computer-readable code 92 can be used at one or more stages of a semiconductor design and fabrication process, including an electronic design automation (EDA) stage, to fabricate an integrated circuit comprising the apparatus 94 embodying the concepts. The above computer-readable code 92 may additionally or alternatively enable the definition, modelling, simulation, verification and/or testing of an apparatus 94 embodying the concepts described herein.

For example, the computer-readable code 92 for fabrication of an apparatus 94 embodying the concepts described herein can be embodied in code defining a hardware description language (HDL) representation of the concepts. For example, the code 92 may define a register-transfer-level (RTL) abstraction of one or more logic circuits for defining an apparatus 94 embodying the concepts. The code 92 may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code 92 may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code 92 may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code 92 a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

Such computer-readable code 92 can be disposed in any known transitory computer-readable medium 96 (such as wired or wireless transmission of code over a network) or non-transitory computer-readable medium 96 such as semiconductor, magnetic disk, or optical disc. An integrated circuit fabricated using the computer-readable code 92 may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
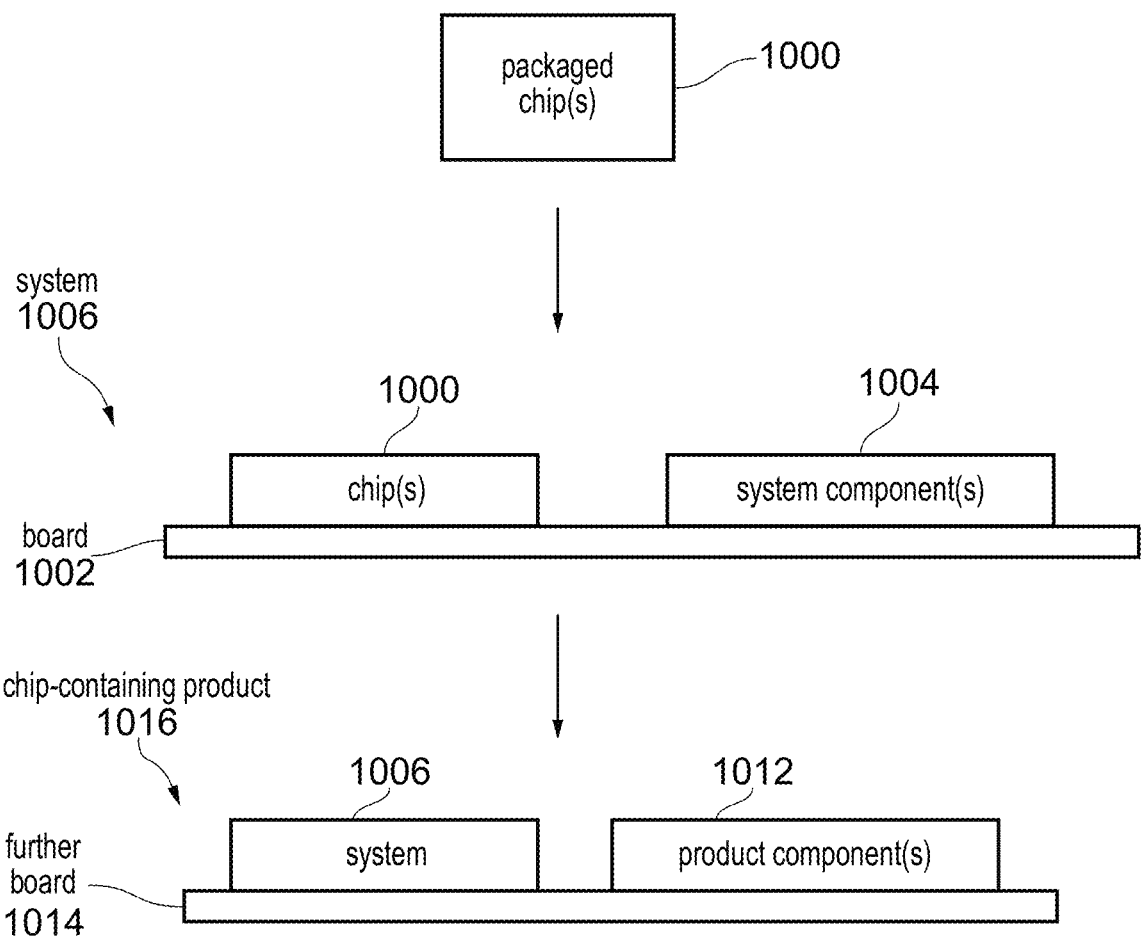
FIG. 11 schematically illustrates a system and a chip-containing product.

As shown in FIG. 11, one or more packaged chips 1000, with the apparatus described above implemented on one chip or distributed over two or more of the chips, are manufactured by a semiconductor chip manufacturer. In some examples, the chip product 1000 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1000 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1000 are assembled on a board 1002 together with at least one system component 1004. For example, the board may comprise a printed circuit board. The board substrate may be made of any of a variety of materials, e.g. plastic, glass, ceramic, or a flexible substrate material such as paper, plastic or textile material. The at least one system component 1004 comprises one or more external components which are not part of the one or more packaged chip(s) 1000. For example, the at least one system component 1004 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1010 is manufactured comprising the system 1006 (including the board 1002, the one or more chips 1000 and the at least one system component 1004) and one or more product components 1012. The product components 1012 comprise one or more further components which are not part of the system 1006. As a non-exhaustive list of examples, the one or more product components 1012 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1006 and one or more product components 1012 may be assembled on to a further board 1014.

The board 1002 or the further board 1014 may be provided on or within a device housing or other structural support (e.g. a frame or blade) to provide a product which can be handled by a user and/or is intended for operational use by a person or company.

The system 1006 or the chip-containing product 1016 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some examples of the present invention are set out in the following clauses:

(1) An apparatus comprising:
   prefetching circuitry configured to predict a predicted address expected to be indicated by a load instruction based on an iterative history of instructions, and to cause a cache line comprising a data value associated with the predicted address to be placed in a cache;
   data pre-alignment circuitry configured to pre-align the data value based on the predicted address to generate a pre-aligned data value, wherein the pre-aligned data value is formatted for storage in a register to be specified by the future load instruction;
   a pre-aligned data cache for storage of the pre-aligned data value in association with the predicted address; and
   load handling circuitry configured to perform load operations in response to receiving load instructions, wherein
   the pre-aligned data cache is configured to return the pre-aligned data value to the load handling circuitry in response to the load instruction indicating an address corresponding to the predicted address, and
   the load handling circuitry is configured to suppress a memory access request specifying the address indicated by the load instruction in response to the pre-aligned data cache returning the pre-aligned data value.

(2) The apparatus of clause (1), wherein
   in response to the load instruction indicating an address not corresponding to the predicted address, the pre-aligned data cache is configured to invalidate the pre-aligned data value.

(3) The apparatus of clause (1) or clause (2), wherein
   the data pre-alignment circuitry is configured to pre-align the data by performing at least one of: masking, bit-shifting, zero extending, and sign extending.

(4) The apparatus of any of clauses (1) to (3), wherein
   the pre-aligned data cache is indexed by a program counter value expected to be associated with the load instruction; and
   the pre-aligned data cache is configured to locate the pre-aligned data value based on a current program counter value associated with the load instruction.

(5) The apparatus of any of clauses (1) to (3), wherein
   the prefetching circuitry is configured to track a number of iterations of the iterative history of instructions and to predict a predicted iteration value of a predicted iteration, wherein the load instruction is expected to be executed in the predicted iteration;

the pre-aligned data cache is indexed by a hash value of a program counter value expected to be associated with the load instruction and the predicted iteration value; and the pre-aligned data cache is configured to locate the pre-aligned data value based on a hash value of a current program counter value and a current iteration value.

(6) The apparatus of any of clauses (1) to (5), further comprising:

store monitoring circuitry configured to monitor store operations performed by store handling circuitry, wherein in response to a store operation indicating the predicted address, the monitoring circuitry is configured to cause the pre-aligned data cache to invalidate the pre-aligned data value.

(7) The apparatus of clause (6), wherein:

in response to the store operation, the store monitoring circuitry is configured to cause the data pre-alignment circuitry to generate an updated pre-aligned data value based on a stored data value specified by the store operation; and the data pre-alignment circuitry is configured to store the updated pre-aligned data value in the pre-aligned data cache in association with the predicted address.

(8) The apparatus of any of clauses (1) to (7), further comprising:

store handling circuitry configured to modify data at an instruction address of the load instruction, wherein in response to modifying the data at the instruction address of the load instruction, the store handling circuitry is configured to cause the pre-aligned data value to be invalidated.

(9) The apparatus of any of clauses (1) to (8), further comprising:

processing circuitry configured to perform data processing in response to instructions associated with one of a plurality of instances of software, wherein the pre-aligned data cache is configured to store the pre-aligned data value in association with an indicator corresponding to a current instance of software, wherein in response to the processing circuitry switching from the current instance of software to another one of the plurality of instances of software, the processing circuitry is configured to cause the pre-aligned data cache to invalidate the pre-aligned data value based on the indicator.

(10) The apparatus of clause (9), wherein the indicator is an application specific identifier.

(11) The apparatus of any of clauses (1) to (10), comprising:

filter circuitry configured to suppress generation of the pre-aligned data value by the data pre-alignment circuitry in response to a store instruction specifying the predicted address being predicted to occur before the load instruction.

(12) The apparatus of any of clauses (1) to (11), wherein the prefetching circuitry is responsive to a determination of whether the cache line comprising the data value is currently in the cache; wherein in response to a determination that the cache line is currently in the cache, the prefetching circuitry is configured to cause the data pre-alignment circuitry to pre-align the data value based on the predicted address; and in response to a determination that the cache line is not currently in the cache, the prefetching circuitry is configured to suppress the pre-alignment circuitry until the cache line has been placed in the cache.

(13) A system comprising:

the apparatus of any of clauses (1) to (12), implemented in at least one packaged chip;

at least one system component; and a board, wherein the at least one packaged chip and the at least one system component are assembled on the board.

(14) A chip-containing product comprising the system of clause (13) assembled on a further board with at least one other product component.

(15) A method comprising:

predicting a predicted address expected to be indicated by a load instruction based on an iterative history of instructions, and causing a cache line comprising a data value associated with the predicted address to be placed in a cache;

pre-aligning the data value based on the predicted address to generate a pre-aligned data value, wherein the pre-aligned data value is formatted for storage in a register to be specified by the future load instruction; and storing the pre-aligned data value in association with the predicted address, returning the pre-aligned data value in response to the load instruction indicating an address corresponding to the predicted address; and suppressing a memory access request specifying the address indicated by the load instruction in response to returning the pre-aligned data value.

(16) A non-transitory computer-readable medium to store computer-readable code for fabrication of an apparatus comprising:

prefetching circuitry configured to predict a predicted address expected to be indicated by a load instruction based on an iterative history of instructions, and to cause a cache line comprising a data value associated with the predicted address to be placed in a cache;

data pre-alignment circuitry configured to pre-align the data value based on the predicted address to generate a pre-aligned data value, wherein the pre-aligned data value is formatted for storage in a register to be specified by the future load instruction;

a pre-aligned data cache for storage of the pre-aligned data value in association with the predicted address; and load handling circuitry configured to perform load operations in response to receiving load instructions, wherein the pre-aligned data cache is configured to return the pre-aligned data value to the load handling circuitry in response to the load instruction indicating an address corresponding to the predicted address, and the load handling circuitry is configured to suppress a memory access request specifying the address indicated by the load instruction in response to the pre-aligned data cache returning the pre-aligned data value.

In brief overall summary the present techniques allow for data prediction based on memory address predicted by a prefetcher. By predicting the data that is expected to be required by a load instruction in the future, the load instruction may be performed more quickly. In particular, the latency of performing a memory access may be reduced or removed entirely, reducing the likelihood of requiring a stall to the execution pipeline, and improving performance when executing a program.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
   prefetching hardware circuitry configured to predict an address expected to be indicated by a load instruction based on an iterative history of instructions, and to cause a cache line comprising a data value associated with the predicted address to be placed in a cache;
   data pre-alignment circuitry configured to pre-align the data value based on the predicted address to generate a pre-aligned data value, wherein the pre-aligned data value is formatted for storage in a register to be specified by the load instruction;
   a pre-aligned data cache configured to store of the pre-aligned data value in association with the predicted address; and
   load handling circuitry configured to perform load operations in response to receiving load instructions, wherein
   the pre-aligned data cache is configured to return the pre-aligned data value to the load handling circuitry in response to the load instruction indicating an address corresponding to the predicted address, and
   the load handling circuitry is configured to suppress a memory access request specifying the address indicated by the load instruction in response to the pre-aligned data cache returning the pre-aligned data value.

2. The apparatus of claim 1, wherein
   in response to the load instruction indicating an address not corresponding to the predicted address, the pre-aligned data cache is configured to invalidate the pre-aligned data value.

3. The apparatus of claim 1, wherein
   the data pre-alignment circuitry is configured to pre-align the data value by performing at least one of: masking, bit-shifting, and zero extending or sign extending.

4. The apparatus of claim 1, wherein
   the pre-aligned data cache is indexed by a program counter value expected to be associated with the load instruction; and
   the pre-aligned data cache is configured to locate the pre-aligned data value based on a current program counter value associated with the load instruction.

5. The apparatus of claim 1, wherein
   the prefetching hardware circuitry is configured to track a number of iterations of the iterative history of instructions and to predict an iteration value of a predicted iteration, wherein the load instruction is expected to be executed in the predicted iteration;
   the pre-aligned data cache is indexed by a hash value of a program counter value expected to be associated with the load instruction and the predicted iteration value; and
   the pre-aligned data cache is configured to locate the pre-aligned data value based on a hash value of both a current program counter value and a current iteration value.

6. The apparatus of claim 1, further comprising:
   store monitoring circuitry configured to monitor store operations performed by store handling circuitry, wherein
   in response to a store operation indicating the predicted address, the store monitoring circuitry is configured to cause the pre-aligned data cache to invalidate the pre-aligned data value.

7. The apparatus of claim 6, wherein:
   in response to the store operation, the store monitoring circuitry is configured to cause the data pre-alignment circuitry to generate an updated pre-aligned data value based on a stored data value specified by the store operation; and
   the data pre-alignment circuitry is configured to store the updated pre-aligned data value in the pre-aligned data cache in association with the predicted address.

8. The apparatus of claim 1, further comprising:
   store handling circuitry configured to modify data at an instruction address of the load instruction, wherein
   in response to modifying the data at the instruction address of the load instruction, the store handling circuitry is configured to cause the pre-aligned data value to be invalidated.

9. The apparatus of claim 1, further comprising:
   processing circuitry configured to perform data processing in response to instructions associated with one of a plurality of instances of software, wherein
   the pre-aligned data cache is configured to store the pre-aligned data value in association with an indicator corresponding to a current instance of software, and
   wherein in response to the processing circuitry switching from the current instance of software to another one of the plurality of instances of software, the processing circuitry is configured to cause the pre-aligned data cache to invalidate the pre-aligned data value based on the indicator.

10. The apparatus of claim 9, wherein
    the indicator is an application specific identifier.

11. The apparatus of claim 1, comprising:
    filter circuitry configured to suppress generation of the pre-aligned data value by the data pre-alignment circuitry in response to a store instruction specifying the predicted address being predicted to occur before the load instruction.

12. The apparatus of claim 1, wherein
    the prefetching hardware circuitry is responsive to a determination of whether the cache line comprising the data value is currently in the cache; wherein
    in response to a determination that the cache line is currently in the cache, the prefetching hardware circuitry is configured to cause the data pre-alignment circuitry to pre-align the data value based on the predicted address; and in response to a determination that the cache line is not currently in the cache, the prefetching hardware circuitry is configured to suppress the data pre-alignment circuitry until the cache line has been placed in the cache.

13. A system comprising:
the apparatus of claim 1, implemented in at least one packaged chip;
at least one system component; and
a board,
wherein the at least one packaged chip and the at least one system component are assembled on the board.

14. A chip-containing product comprising the system of claim 13 assembled on a further board with at least one other product component.

15. A method comprising:
predicting an address expected to be indicated by a load instruction based on an iterative history of instructions, and causing a cache line comprising a data value associated with the predicted address to be placed in a cache;
pre-aligning the data value based on the predicted address to generate a pre-aligned data value, wherein the pre-aligned data value is formatted for storage in a register to be specified by the load instruction;
storing the pre-aligned data value in association with the predicted address,
returning the pre-aligned data value in response to the load instruction indicating an address corresponding to the predicted address; and
suppressing a memory access request specifying the address indicated by the load instruction in response to returning the pre-aligned data value.

16. A non-transitory computer-readable medium to store computer-readable code for fabrication of an apparatus comprising:
prefetching circuitry configured to predict an address expected to be indicated by a load instruction based on an iterative history of instructions, and to cause a cache line comprising a data value associated with the predicted address to be placed in a cache;
data pre-alignment circuitry configured to pre-align the data value based on the predicted address to generate a pre-aligned data value, wherein the pre-aligned data value is formatted for storage in a register to be specified by the load instruction;
a pre-aligned data cache configured to store the pre-aligned data value in association with the predicted address; and
load handling circuitry configured to perform load operations in response to receiving load instructions, wherein
the pre-aligned data cache is configured to return the pre-aligned data value to the load handling circuitry in response to the load instruction indicating an address corresponding to the predicted address, and
the load handling circuitry is configured to suppress a memory access request specifying the address indicated by the load instruction in response to the pre-aligned data cache returning the pre-aligned data value.

* * * * *